United States Patent [19]

Nakajo et al.

[11] Patent Number: 6,162,957
[45] Date of Patent: *Dec. 19, 2000

[54] CATALYTIC DECOMPOSITION OF PERFLUORO-COMPOUND

[75] Inventors: Tetsuo Nakajo; Masatoshi Hotta; Hiromoto Ohno; Toshio Ohi, all of Kawasaki; Yusaku Takita, Oita, all of Japan

[73] Assignee: Showa Denko K.K., Tokyo, Japan

[ * ] Notice: This patent is subject to a terminal disclaimer.

[21] Appl. No.: 09/484,222

[22] Filed: Jan. 18, 2000

Related U.S. Application Data

[63] Continuation-in-part of application No. 09/045,823, Mar. 23, 1998, Pat. No. 6,023,007.

[30] Foreign Application Priority Data

| Mar. 24, 1997 | [JP] | Japan | 9-070029 |
| Mar. 9, 1998 | [JP] | Japan | 10-056612 |

[51] Int. Cl.$^7$ .......................... A62D 3/00; B01D 47/00; C01B 7/00
[52] U.S. Cl. .......................... 588/205; 588/206; 588/238; 588/242; 588/244; 588/246; 423/210; 423/240 R; 423/659
[58] Field of Search ........................ 588/205, 206, 588/238, 242, 244, 246; 423/210, 659, 240 R; 208/262.1

[56] References Cited

U.S. PATENT DOCUMENTS

| 5,276,249 | 1/1994 | Greene et al. | 588/206 |
| 5,514,205 | 5/1996 | Awaji | 96/152 |

FOREIGN PATENT DOCUMENTS

| 43 11 061 | 10/1994 | Germany | B01D 53/36 |
| 61-35849 | 2/1986 | Japan | B01J 20/04 |
| 62-273039 | 11/1987 | Japan | B01J 53/36 |
| 6-54925 | 3/1994 | Japan | A62D 3/00 |
| 6-104183 | 4/1994 | Japan | H01L 21/205 |
| 7-116466 | 5/1995 | Japan | B01D 53/68 |
| 7-132211 | 5/1995 | Japan | B01D 53/68 |
| 8-257359 | 10/1996 | Japan | B01D 53/70 |
| 8-309147 | 11/1996 | Japan | B01D 53/70 |
| 94-05399 | 3/1994 | WIPO | B01D 53/34 |

OTHER PUBLICATIONS

Catalyst Conference Abstracts, 1997, 9.20, p. 242.
Catalyst Conference Abstracts, 1997, 5.20, p. 243.

*Primary Examiner*—Tom Dunn
*Assistant Examiner*—Eileen E. Nave
*Attorney, Agent, or Firm*—Sughrue, Mion, Zinn, Macpeak & Seas, PLLC

[57] ABSTRACT

A method for decomposing a perfluorocarbon in the presence of water vapor or water vapor and molecular oxygen in gas phase, in which a catalyst of a phosphate comprising at least one element selected from the group consisting of aluminum, boron, alkali earth metal, titanium, zirconium, lanthanum, cerium, yttrium, rare earth metal, vanadium, niobium, chromium, manganese, iron, cobalt and nickel, and phosphorus oxide, is used.

14 Claims, No Drawings

CATALYTIC DECOMPOSITION OF PERFLUORO-COMPOUND

This is Continuation-in-Part of application Ser. No. 09/045,823 filed Mar. 23, 1998, now U.S. Pat. No. 6,023,007.

BACKGROUND OF THE INVENTION

1. Field of the Invention

The present invention relates to a process for decomposing a perfluoro-compound. More specifically, the present invention relates to a process for decomposing a perfluoro-compound in the gas phase with water vapor or water vapor and molecular oxygen in the presence of a specific catalyst.

2. Description of the Related Art

Perfluoro-compounds are mainly used in semiconductor etching process and the like, in the form of a fluorine-containing etching or cleaning gas. Also, sulfur hexafluoride, particularly excellent in electrical insulation, is used in cables, condensers, transformers and so on. Perfluoro-compounds are also widely used in other fields since they are generally stable and not toxic to a human body.

Nevertheless, it has been recently pointed out that perfluoro-compounds have a large global warming potential and are one of the causes of global warming. Due to progress of the global environment protection movement, technology for decomposing perfluoro-compounds to non-toxic substances which do not influence the global environment, has been demanded.

Among conventional methods of decomposing perfluoro-compounds, particularly fluorocarbons, burning method where $CF_4$ is burned over a sufficient time period can be mentioned (WO94/05399). An improvement of a burning apparatus used therefor was also proposed (Japanese Unexamined Patent Publication (Kokai) No. 8-309147). However this apparatus has problems, for example, the treatment capacity is small and the apparatus requires expensive materials. A bombing method was also proposed for decomposing fluorocarbon (Japanese Unexamined Patent Publication (Kokai) No. 6-54925). This method allows complete decomposition of fluorocarbon but continuous mass treatment is difficult due to its form.

The other conventional methods of decomposing fluorocarbons include a cement kiln burning method, a plasma decomposing method, a supercritical water method, etc. However, these method also have problems. The apparatus used in the cement kiln burning method is limited in availability depending on the place and is not a general treatment apparatus. The plasma decomposing method has problems in large apparatus and operating cost. The supercritical water method have problems in installation and operation due to the high temperature and high pressure conditions.

In addition to these conventional methods, methods using a decomposing agent were recently proposed. The methods using a decomposing agent include a method of treating a gas containing fluorocarbon with a treatment agent in which an alkali earth metal salt is supported on activated carbon (Japanese Unexamined Patent Publication (Kokai) No. 61-35849), a method of removing by reacting with a solid hydride (Japanese Unexamined Patent Publication (Kokai) No. 8-257359), a method of treating with a decomposing agent at a high temperature of 1100° C. or higher, optionally in the copresence of hydrogen fluoride (Japanese Unexamined Patent Publication (Kokai) Nos. 7-116466 and 7-132211), and so on. However, these decomposing agents are consumed along with the treatment of fluorocarbon and must be supplemented at least to the theoretical amount, making the methods significantly uneconomical and, therefore, the methods are not suitable for mass treatment.

A catalytic decomposition of fluorocarbons has been investigated to solve the above problems of the above conventional fluorocarbon decomposition methods.

Japanese Examined Patent Publication (Kokoku) No. 6-104183 can be mentioned as a fluorocarbon catalytic decomposition method. By the catalysts disclosed in this publication, chlorine-containing fluorocarbons ($C_2Cl_3F_3$, $CCl_2F_2$, $CHClF_2$, $CClF_3$, etc. ) are completely decomposed. However, these catalysts do not exhibit a catalytic activity for a perfluorocarbon of $CF_4$ even at an elevated temperature, demonstrating the difficulty in catalytic decomposition of perfluorocarbons.

The proposed decomposition methods for $NF_3$ or $SF_6$ are similar to those for fluorocarbons. The $NF_3$ decomposition methods reported include decomposition by zeolite in Chem. Mater. (1996), 8(6) 1217–1221, decomposition by alumina or silica in DE4311061 or Japanese Unexamined Patent Publication (Kokai) No. 62-273039, and decomposition by activated carbon supporting magnesium oxide in Japanese Unexamined Patent Publication (Kokai) No. 5-15740. The $SF_6$ decomposition methods reported include decomposition by cement kiln in Cim., Betons, Platres Chaus (1991), 791, 218–220 (CA; 161:240708) and treatment by a decomposing agent comprising a hydrogen fluoride-treated inorganic oxide in Japanese Unexamined Patent Publication (Kokai) No. 7-116466.

However, these $NF_3$ or $SF_6$ decomposition methods also have problems similar to those of the fluorocarbon decomposition methods and a catalyst effective for catalytic decomposition is demanded.

As described above, a catalyst which has a sufficient activity and life for catalytic decomposition of perfluoro-compounds has not been reported. The present inventors considered the above and propose a process for catalytically decomposing a perfluoro-compound, which provides a sufficient catalytic activity of decomposing a perfluoro-compound at a relatively low temperature and with a long catalyst life.

SUMMARY OF THE INVENTION

The present inventors conducted a vigorous investigation to solve the above problems and completed the present invention by finding a method for decomposing a perfluoro-compound characterized by contacting a perfluoro-compound in the gas phase with a phosphate as the catalyst in the presence of water vapor or water vapor and molecular oxygen.

DESCRIPTION OF THE PREFERRED EMBODIMENTS

The present invention is described more in detail in the following.

Examples of carbon-containing perfluoro-compound, i.e., perfluorocarbon, are tetrafluoromethane ($CF_4$)1 hexafluoroethane ($C_2F_6$), tetra fluoroethene ($C_2F_4$), octafluoropropane ($C_3F_8$), hexafluoropropene ($C_3F_6$), decafluorobutane ($C_4F_{10}$), cyclooctafluorobutane ($C_4F_8$), octafluorobutene ($C_4F_8$) and other saturated- or unsaturated-, aliphatic, cycloaliphatic or aromatic perfluorcarbons, but these are not limitive. The present invention is suitable to a compound having 1 to 6 carbons.

Examples of nitrogen- or sulfur-containing perfluoro-compound, i.e., perfluoronitrogen or perfluorosulfur, are $NF_3$, $SF_6$, $SF_4$, $S_4F_{10}$ and so on, but these are not limitive.

The perfluoro-compound which can be used in the present invention may be a single compound or a mixture thereof or may additionally contain a fluoro-compound other than a perfluoro-compound. The fluoro-compound other than a perfluoro-compound includes, for example, chlorofluorocarbons (hereinafter abbreviated as "CFC"), hydrochlorofluorocarbons (hereinafter abbreviated as "HCFC"), hydrofluorocarbons (hereinafter abbreviated as "HFC") and so on, but these are not limitive. Halogen compounds other than fluoro-compounds, hydrocarbons and other compounds may be contained further.

The catalyst used in the present invention is described. The phosphate used in the present invention can be exemplified by aluminum phosphate, boron phosphate, calcium phosphate, magnesium phosphate, strontium phosphate, barium phosphate, titanium phosphate, zirconium phosphate, lanthanum phosphate, cerium phosphate, yttrium phosphate, scandium phosphate, praseodymium phosphate, neodymium phosphate, samarium phosphate, europium phosphate, gadolinium phosphate, terbium phosphate, dysprosium phosphate, holmium phosphate, erbium phosphate, thulium phosphate, ytterbium phosphate, lutetium phosphate, vanadium phosphate, niobium phosphate, chromium phosphate, manganese phosphate, iron phosphate, cobalt phosphate and nickel phosphate and composites thereof. Preferably, the phosphate is selected from the group consisting of aluminum phosphate, boron phosphate, calcium phosphate, magnesium phosphate, strontium phosphate, barium phosphate, titanium phosphate, zirconium phosphate, lanthanum phosphate, cerium phosphate, yttrium phosphate, scandium phosphate, praseodymium phosphate, neodymium phosphate, samarium phosphate, europium phosphate, gadolinium phosphate, terbium phosphate, dysprosium phosphate, holmium phosphate, erbium phosphate, thulium phosphate, ytterbium phosphate and lutetium phosphate and composites thereof.

The phosphate used in the present invention is amorphous when observed by X-ray diffraction (hereinafter referred to as "XRD"), but peaks indicating crystals may be partially included.

The preparation method of the catalyst is not particularly limited. A general precipitation method is preferred. An example of a concrete preparation method comprises adding a diluted aqueous ammonia, dropwise, to a mixed aqueous solution of a metal nitrate (if it comprises a plurality of starting salts, solutions for respective starting salts are prepared) and phosphoric acid to neutralize and precipitate, which is optionally allowed to be placed and age. The precipitate was then washed with water, and sufficient washing is confirmed, for example, by measuring the electrical conductivity of the washed water. If necessary, a portion of the slurry is sampled and the alkali metal contained therein is measured. The slurry is further filtered and dried. The drying temperature is not particularly limited. Preferred is 80° C. to 150° C. Further preferred is 100° C. to 130° C. The obtained, dry solid is pulverized, and the particle size is then adjusted or it is further pulverized and shaped. Thereafter, it is heat treated at 500° C. to 1500° C. in air. The heat treatment in air is conducted preferably at 800° C. to 1400° C., more preferably 900° C. to 1200° C.

The time period of the heat treatment is about 1 hour to 50 hours, preferably 2 hours to 24 hours, although it depends on the temperature. A long heat treatment at a high temperature involves problems such as acceleration of crystallization and economical disadvantage. A short heat treatment does not give a sufficient effect.

The catalyst may contain other metal component(s). Such other metal components can be exemplified by cerium lanthanum, yttrium, chromium, iron, cobalt and nickel but are not limited to these. Cerium, iron and yttrium are preferred.

Addition of the above metal component is preferably conducted through a metal salt and a nitrate, a chloride, oxide, a phosphate or the like of said metal is preferred. Of these, nitrate is preferred due to easy preparation. The amount of the addition not particularly limited to is 1 gram-atom or less, preferably 0.5 gram-atom or less, more preferably 0.3 gram-atom or less, per 1 gram-atom of phosphorus. The metal component may be added during the preparation of the catalyst or may be added to a phosphate after the heat treatment of the catalyst.

The obtained catalysts are different in their properties depending on the kind of salt and preparation method or conditions. For example, the aluminum phosphate used in the present invention has a BET specific surface area of 50 $m^2/g$ or more, preferable 80 $m^2/g$ or more immediately after the preparation thereof. It is amorphous when observed by the XRD while peaks of $AlPO_4$ may partially exist.

The catalyst may be used as is or after being supported on a support. The support includes alumina, silicon carbide, activated carbon and so on but is not limitive.

The composition of the gas used in the present invention is now described.

The content of the perfluoro-compound in the feed gas is not particularly limited but is preferably in a range of 0.01 mol % to 50 mol % based on the total feed gas, with 0.05 mol % to 30 mol % being more preferred. If it is too low, it is economically disadvantageous. If it is too high, a large unreacted portion remains and deterioration of the catalyst is accelerated.

The content of the water vapor in the feed gas is preferably in a range of 0.1 mol % to 80 mol %, more preferably in a range of 0.1 mol % to 20 mol %, further preferably in a range of 0.1 mol % to 10 mol %. Further, a range of 0.1 mol % to less than 5 mol % is particularly preferred when the catalyst life is considered.

Optionally, oxygen may be contained in the feed gas. The content of the oxygen is preferably in a range of 0 mol % to 30 mol % based on the total feed gas, with 1 mol % to 20 mol % being more preferred. If it is too high, there may be problems as crystallization of the catalyst being accelerated and the specific surface area of the catalyst decreasing, resulting in reduction of the activity of the catalyst.

While it depends on the kind of the compound, the treated amount, temperature, catalyst, etc., the rate between the perfluoro-compound, oxygen and water vapor in the feed gas is generally preferably (perfluoro-compound):(oxygen):(water vapor)=1:1-70:1-500 by mole, more preferably (perfluoro-compound):(oxygen):(water vapor)=1:1-40:1-150 by mole.

The oxygen source used for the feed gas may be air. In this case, nitrogen accompanies the air, but it is not a problem. In some case, the nitrogen is expected to act as a dilution gas since the reaction is exothermic. Moreover, carbonic acid gas, nitrogen gas and the like produced after the decomposition may be positively recycled to the reaction system. Further, helium, argon and the like may be used as the dilution gas.

When, in accordance with the present invention, a perfluoro-compound is contacted with a phosphate as the catalyst in the presence of water vapor or water vapor and oxygen, the fluorine elements in the perfluoro-compound can be separated from the elements such as carbon, sulfur and nitrogen, to which the fluorine elements have been bonded, and particularly the complete defluorination is possible. In the following Examples, although the present invention is not limited thereto, the elements such as carbon, sulfur and nitrogen produced their oxides and the amounts of the oxides completely correspond to the amounts of the reacted perfluoro-compounds, which revealed that the selectivity for the perfluoro-compound was 100%. In accordance with the measurement by the alkali absorption method, the fluorine atoms in the perfluoro-compound are believed to have produced fluoric acid.

The decomposition reaction conditions in the present invention are described.

The reaction temperature is preferably 200° C. to 1200° C., more preferably 300° C. to 1000° C., most preferably 350° C. to 850° C., although it depends on the kind of the perfluoro-compound to be decomposed. If the decomposition is conducted at a temperature higher than 1200° C., problems appear, for example, the catalyst life rapidly decreases. If it is lower than 200° C., the amount of the undecomposed perfluoro-compound increases and it is not economical.

The space velocity, which is the amount of the feed gas based on the catalyst, is preferably in a range of 10 $hr^{-1}$ to 10000 $hr^{-1}$, more preferably 100 $hr^{-1}$ to 5000 $hr^{-1}$.

The form of the reaction is not particularly limited, but a gas phase flow-type fixed bed is typical. A flowing bed-type may be also used. The material of the reactor depends on the amount to be treated and the kind of starting materials, and SUS 316 may be used if the amount to be treated is small. Preferably Inconel, Monel, Hastelloy C, nickel or the like is used.

If the reaction is conducted in a continuous flow-mode for a long time period, the catalyst decreases in its activity and conversion rate. In such a case, adjusting the reaction temperature and contact time to maintain the conversion rate constant is an effective method. Controlling the amount of oxygen is also possible.

In accordance with the present invention, the decomposition reaction of a perfluoro-compound can be effectively conducted with a long life by using a phosphate catalyst in the presence of water vapor, optionally with oxygen.

EXAMPLES

The present invention is concretely described below, but the present invention is not limited to these examples.

Catalyst Preparation Example 1 (Preparation of Aluminum Phosphate)

At room temperature, 800 g of pure water was measured and poured in a 5 l-beaker in which 150 g of aluminum nitrate ($Al(NO_3)_3.9H_2O$) was added and dissolved. To this aqueous solution, 46 g of 85% aqueous solution of phosphoric acid was added to obtain an aqueous solution A and a stirring device was set to the beaker. 10% aqueous ammonia in an amount sufficient to neutralize the aqueous solution A was dropwisely added to the aqueous solution A over 10 hours to adjust pH to 7. The resultant precipitation was allowed to stand for aging for 16 hours. The precipitation was separately by filtration and filtration washing with pure water was repeated until the conductivity of the filtrate becomes 1 mS/cm or lower. The obtained solid was set in a dryer and dried at 120° C. for 20 hours. The solid was then heat treated in air at 1000° C. for 5 hours. The obtained solid was pulverized to 14 to 32 mesh and used as a catalyst.

The catalyst had a BET specific surface area of 132 $m^2/g$ and was amorphous accordingly to XRD.

Catalyst Preparation Example 2 (Preparation of Magnesium Phosphate)

This catalyst was prepared in the same manner as in Catalyst Preparation Example 1 except that 103 g of magnesium nitrate ($Mg(NO_3)_2.6H_2O$)) was used instead of aluminum nitrate.

The catalyst had a BET specific surface area of 63 $m^2/g$ and was morphous according to XRD.

Catalyst Preparation Example 3 (Preparation of Calcium Phosphate)

This catalyst was prepared in the same manner as in

Catalyst Preparation Example 1 except that 94 g of calcium nitrate ($Ca(NO3)_2.4H20$) was used instead of aluminum nitrate.

The catalyst had a BET specific surface area of 51 $m^2/g$ and was amorphous according to the XRD.

Catalyst Preparation Example 4 (Preparation of Boron Phosphate)

46.1 g of 85% aqueous solution of phosphoric acid was measured in a ceramic crucible, to which 24.7 g of boric acid was gradually added. After addition of the boric acid was completed, the solution was heated to 80° C. while stirring until a white semi-solid was obtained. It was dried at 100° C. for 24 hours and then heat treated in air at 400° C. for 3 hours.

The BET specific surface area of the solid was 24 $m^2/g$.

Catalyst Preparation Example 5–10 (Preparation of Complex Phosphates)

These catalysts were prepared in the same manner as in Catalyst Preparation Example 1 except that metal salts A and B as shown in Table 1 were used together, instead of aluminum nitrate.

TABLE 1

| Catalyst Preparation Example | Metal salt A | Used amount (g) | Metal salt B | Used amount (g) | Atomic ratio between metal salts A and B (A:B) |
|---|---|---|---|---|---|
| 5 | 20% aqueous solution of $TiCl_3$ | 518 | $ZrO(NO_3) \cdot 2H_2O$ | 35.6 | 2:1 |
| 6 | $Al(NO_3)_3 \cdot 9H_2O$ | 135 | $La(NO_3)_3 \cdot 6H_2O$ | 17.3 | 9:1 |
| 7 | $Al(NO_3)_3 \cdot 9H_2O$ | 135 | $Ce(NO_3)_3 \cdot 6H_2O$ | 17.4 | 9:1 |
| 8 | $Al(NO_3)_3 \cdot 9H_2O$ | 135 | $Y(NO_3)_3 \cdot 6H_2O$ | 15.3 | 9:1 |
| 9 | $Al(NO_3)_3 \cdot 9H_2O$ | 120 | 40% aqueous solution of $Cr(NO_3)_3$ | 47.6 | 4:1 |
| 10 | $Al(NO_3)_3 \cdot 9H_2O$ | 143 | $Ni(NO_3)_2 \cdot 6H_2O$ | 5.8 | 19:1 |

Catalyst Preparation Example 11 (Preparation of Adding Metal to Aluminum Phosphate)

Into an aqueous solution of 15.5 g of cerium nitrate ($Ce(NO_3)_3 \cdot 6H_2O$) in 50 g of pure water, 50 g of aluminum phosphate obtained in Catalyst Preparation Example 1 was gradually added while stirring at room temperature. After addition of the aluminum phosphate was completed, the solution was gradually heated in a water bath from room temperature to 80° C. for impregnation and drying. The solid was then dried at 120° C. for 20 hours and heat treated at 1000° C. in air for 5 hours. The obtained solid was pelletized and then pulverized and formulated to 14 to 32 mesh, which was used as the catalyst.

Examples 1 to 16 (Reaction Examples)

The reaction was conducted in a normal pressure fixed bed flow-type reaction apparatus. The reaction tube used was a stainless tube with an inner diameter of 16 mm connected with a stainless tube with an inner diameter of 13 mm. Gases of nitrogen, oxygen and tetrafluoromethane ($CF_4$) as a fluorocarbon were mixed and then fed to a catalyst layer of the reaction tube. Water was added by a microfeeder.

The gas obtained after the reaction was treated with an alkali trap to collect an acid which had been produced by the decomposition and the gas thus treated was analyzed by TCD gas chromatography.

13.5 g of each of the catalysts prepared in Catalyst Preparation Examples 1 to were charged in said reaction tube, $CF_4$ was used as the per fluoro-compound, and the composition of the feed gas was $CF_4:O_2:N_2:H_2O = 0.5:9.3:37.4:57.8$ (ml/min), that is 0.5 mol % of $CF_4$, 55 mol % of $H_2O$ and the remainder being air.

The reaction temperature and the results are shown in Table 2 and 3.

TABLE 2

| Example | Catalyst | Reaction Temperature | Conversion rate of $CF_4$ | Selectivity to $CO_2$ |
|---|---|---|---|---|
| 1 | Catalyst of Catalyst Preparation Example 1 | 650° C. | 5.9% | 100% |
| 2 | Catalyst of Catalyst Preparation Example 1 | 700° C. | 39.7% | 100% |
| 3 | Catalyst of Catalyst Preparation Example 2 | 730° C. | 2.1% | 100% |
| 4 | Catalyst of Catalyst Preparation Example 3 | 410° C. | 0.3% | 100% |
| 5 | Catalyst of Catalyst Preparation Example 4 | 700° C. | 15.0% | 100% |

TABLE 3

| Example | Catalyst | Reaction Temperature | Conversion rate of $CF_4$ | Selectivity to $CO_2$ |
|---|---|---|---|---|
| 6 | Catalyst of Catalyst Preparation Example 5 | 710° C. | 7.0% | 100% |
| 7 | Catalyst of Catalyst Preparation Example 6 | 675° C. | 26.8% | 100% |
| 8 | Catalyst of Catalyst Preparation Example 7 | 575° C. | 26.0% | 100% |
| 9 | Catalyst of Catalyst Preparation Example 7 | 650° C. | 54.4% | 100% |
| 10 | Catalyst of Catalyst Preparation Example 7 | 700° C. | 100% | 100% |
| 11 | Catalyst of Catalyst Preparation Example 8 | 675° C. | 27.7% | 100% |
| 12 | Catalyst of Catalyst Preparation Example 8 | 700° C. | 43.2% | 100% |
| 13 | Catalyst of Catalyst Preparation Example 9 | 725° C. | 10.3% | 100% |
| 14 | Catalyst of Catalyst Preparation Example 10 | 725° C. | 6.9% | 100% |
| 15 | Catalyst of Catalyst Preparation Example 11 | 650° C. | 51.0% | 100% |
| 16 | Catalyst of Catalyst Preparation Example 11 | 700° C. | 100% | 100% |

Comparative Example 1 (Effect of Water Vapor)

13.5 g of the catalyst prepared in Catalyst Preparation Example 1 was used and the composition of feed gas was $CF_4:O_2:N_2:H_2O = 0.5:20.9:83.6:0$ (ml/min). The reaction temperature and result are shown in Table 4.

TABLE 4

| Example | Catalyst | Reaction Temperature | Conversion rate of $CF_4$ | Selectivity to $CO_2$ |
|---|---|---|---|---|
| 1 | Catalyst of Catalyst Preparation Example 1 | 700° C. | 7.5% | 100% |

Example 17 (Effect of Oxygen)

The catalyst life was examined in a system in which oxygen was not fed. The catalyst of Catalyst Preparation Example 1 was used, the reaction temperature was 700° C., and the composition of the feed gas was $CF_4:O_2:N_2:H_2O=$ 0.5:0:46.7:57.8 (ml/min).

The conversion of $CF_4$ was 21.1%.

Example 18 (Catalyst Action)

The conditions as in Example 2 were used and the reaction was continued for 100 hours. The obtained catalyst revealed by the XRD that although a little crystallization of $AlPO_4$ occurred, no $AlF_3$ crystal was found.

Example 19 (Decomposition Reaction of Hexafluoro-ethane)

The catalyst of Catalyst Preparation Example 1 was used, the reaction temperature was 700° C., and the composition of the feed gas was $C_2F_6:O_2:N_2:H_2O=0.5:9.3:37.4:57.8$ (ml/min).

The conversion rate of $C_2F_6$ was 44.6%.

Example 20 (Decomposition of Cyclooctabutane)

The catalyst of Catalyst Preparation Example 7 was used, the reaction temperature was 650° C., and the composition of the feed gas was $C_4F_8:O_2:N_2:H_2O=0.25:9.3:37.4:57.8$ (ml/min).

The conversion rate of $C_4F_8$ was quantitative (almost 100%).

Example 21 (Mixed Gas of HFC Gas and $CF_4$)

The catalyst of Catalyst Preparation Example 7 was used, the reaction temperature was 700° C., a fluorocarbon mixture of 134a($CF_3CH_2F$), 143a($CF_3CH_3$) and $CF_4$ was used instead of $CF_4$, and carbonic acid gas ($CO_2$) was used instead of the nitrogen gas. The composition of the feed gas was (fluorocarbon mixture):$O_2:CO_2:H_2O=$ 0.25:9.3:37.4:57.8 (ml/min).

The composition rate of the fluorocarbon mixture was quantitative (almost 100%).

Example 22 (Decomposition of $NF_3$)

The catalyst of Catalyst Preparation Example 7 was used, the reaction temperature was 350° C., and the composition of the feed gas was $NF_3:O_2:N_2:H_2O=0.25:9.3:37.4:57.8$ (ml/min).

The composition rate of the $NF_3$ was quantitative (almost 100%).

Example 23 (Decomposition of $NF_3$)

Example 22 was repeated except that the catalyst of Catalyst Preparation Example 9 was used and the reaction temperature was 360° C. The conversion rate of $NF_3$ was 100%.

Example 24 (Decomposition of $SF_6$)

The catalyst of Catalyst Preparation Example 7 was used, the reaction temperature was 650° C., and the composition of the feed gas was $SF_6:O_2:N_2:H_2O=0.25:9.3:37.4:57.8$ (ml/min).

The conversion rate of SF6 was quantitative (almost 100%).

Example 25 (Decomposition of $SF_6$)

Example 24 was repeated except that the catalyst of Catalyst Preparation Example 9 was used and the reaction temperature was 670° C.

The conversion rate of SF6 was quantitative (almost 100%).

Example 26 (Decomposition of $SF_6$)

Example 24 was repeated except that the catalyst of Catalyst Preparation Example 6 was used. The conversion rate of SF6 was quantitative (almost 100%).

Example 27 (Reaction Example)

13.5 g of the catalyst prepared in the same process as in Catalyst Preparation Example 7 was set in a reaction tube similar to that of Examples 1 to 16, in which $CF_4$ was used as the perfluoro-compound, the composition of the feed gas was $CF_4: O_2: N_2: H_2O=0.5: 19: 76:4$ (ml/min), and the decomposition was effected at 700° C.

As a result, the conversion rate of $CF_4$ was 100% after 5 hours and the catalyst activity even after 100 hours was high, 83%. The surface area of the catalyst measured was originally 70 $m^2/g$, which changed to 32 $m^2/g$ after 100 hours of the reaction.

What is claimed is:

1. A method for decomposing a perfluoro-compound, comprising contacting a feed gas comprising a perfluoro-compound, 0.1 mol % to 80 mol % of water vapor and 0 mol % to 30 mol % of oxygen in a gas phase with a catalyst comprising at least one compound selected from the group consisting of aluminum phosphate, boron phosphate, calcium phosphate, magnesium phosphate, strontium phosphate, barium phosphate, titanium phosphate, zirconium phosphate, lanthanum phosphate, cerium phosphate, yttrium phosphate, scandium phosphate, praseodymium phosphate, neodymium phosphate, samarium phosphate, europium phosphate, gadolinium phosphate, terbium phosphate, dysprosium phosphate, holmium phosphate, erbium phosphate, thulium phosphate, ytterbium phosphate, lutetium phosphate, vanadium phosphate, niobium phosphate, chromium phosphate, manganese phosphate, iron phosphate, cobalt phosphate and nickel phosphate and composites thereof, at a temperature in a range of 300° C. to 1000° C.

2. The method according to claim 1, wherein said phosphate is at least one compound selected from the group consisting of aluminum phosphate, boron phosphate, calcium phosphate, magnesium phosphate, strontium phosphate, barium phosphate, titanium phosphate, zirconium phosphate, lanthanum phosphate, cerium phosphate, yttrium phosphate, scandium phosphate, praseodymium phosphate, neodymium phosphate, samarium phosphate, europium phosphate, gadolinium phosphate, terbium phosphate, dysprosium phosphate, holmium phosphate, erbium phosphate, thulium phosphate, ytterbium phosphate and lutetium phosphate and composites thereof.

3. The method according to claim 1 wherein the method comprises feeding a feed gas comprising a perfluoro-compound, and water vapor or water vapor and molecular oxygen to a catalyst bed.

4. The method according to claim 3, wherein said feed gas has a water concentration in a range of 0.1 mol % to 20 mol %.

5. The method according to claim 3, wherein said feed gas has a water concentration in a range of 0.1 mol % to 10 mol %.

6. The method according to claim 3, wherein said feed gas has a water concentration in a range of 0.1 mol % to less than 5 mol %.

7. The method according to claim 3, wherein the method comprises returning a portion or all of gases formed by said decomposition to said feed gas.

8. The method according to claim 3, wherein said feed gas has a molecular oxygen concentration in a range of 0 mol % to 30 mol %.

9. The method according to claim 3, wherein said feed gas has a molecular oxygen concentration in a range of 1 mol % to 20 mol %.

10. The method according to claim 3, wherein said feed gas has a perfluoro-compound concentration in a range of 0.0 1 mol % to 50 mol %.

11. The method according to claim 3, wherein said feed perfluoro-compound is a perfluorocarbon.

12. A method for decomposing a perfluoro-compound of a perfluorosulfur or perfluolonitrogen, comprising contacting a feed gas comprising a perfluorosulful or perfluoronitrogen, 0.1 mol % to 80 mol % of water vapor and 0 mol % to 30 mol % of oxygen in a gas phase with a catalyst comprising at least one compound selected from the group consisting of aluminum phosphate, boron phosphate, calcium phosphate, magnesium phosphate, strontium phosphate, barium phosphate, titanium phosphate, zirconium phosphate, lanthanum phosphate, cerium phosphate, yttrium phosphate, scandium phosphate, praseodymium phosphate, neodymium phosphate, samarium phosphate, europium phosphate, gadolinium phosphate, terbium phosphate, dysprosium phosphate, holmium phosphate, erbium phosphate, thulium phosphate, ytterbium phosphate, lutetium phosphate, vanadium phosphate, niobium phosphate, chromium phosphate, manganese phosphate, iron phosphate, cobalt phosphate and nickel phosphate and composites thereof, at a temperature in a range of 300° C. to 1000° C.

13. The method according to claim 12, wherein said feed gas has a water concentration in a range of 0.1 mol % to less than 5 mol %.

14. The method according to claim 2, wherein the method comprises feeding a feed gas comprising a perfluoro-compound, and water vapor or water vapor and molecular oxygen to a catalyst bed.

* * * * *